United States Patent [19]

Wadia

[11] 4,440,578
[45] Apr. 3, 1984

[54] METHOD AND APPARATUS FOR PROCESSING RAW MEAL HAVING A HIGH ALKALI CHLORIDE AND/OR SULFATE CONTENT

[76] Inventor: Darius A. Wadia, 96 Marine Dr., Bombay, India

[21] Appl. No.: 377,320

[22] Filed: May 12, 1982

[51] Int. Cl.³ .............................................. C04B 7/44
[52] U.S. Cl. .................................................. 106/100
[58] Field of Search ................... 106/100; 432/13, 16, 432/18

[56] References Cited

U.S. PATENT DOCUMENTS

| | | | |
|---|---|---|---|
| 3,451,665 | 6/1969 | Strassen | 106/100 |
| 3,986,886 | 10/1976 | Sylvest | 106/100 |
| 4,035,193 | 7/1977 | Miyamoto et al. | 106/100 |

Primary Examiner—James Poer
Attorney, Agent, or Firm—Thomas R. Vigil

[57] ABSTRACT

The method is used in processing raw meal such as cement raw meal, powdered limestone, alumina hydrate or the like including those having relatively high alkali chloride and/or sulfate content up to 2% Cl and/or 2.5% $SO_3$ and includes the steps of metering the dry raw meal into a processing system, pumping the raw meal in the processing system to a separate combustion chamber, supplying fuel to the combustion chamber and igniting same therein to heat the dry raw meal in the combustion chamber to a temperature between 100° and 600° C. Further, the heated dry raw meal is pumped to a cyclone separator through which it is processed and then supplied to a long dry process alkali rich rotary kiln. In this way, problems due to alkali rich encrustations are reduced, and the thermal efficiency of the entire preheating system is increased.

An apparatus is provided for carrying out the processing of raw meal such as cement raw meal having a relatively high alkali chloride and sulfate content, and includes a dry raw meal hopper, a continuous pneumatic pump, a mechanism for metering dry raw meal to the pump from the hopper, and a separate combustion chamber having an inlet coupled to the outlet of the pump. Fuel is delivered to the chamber and a pilot flame therein ignites the fuel to heat the dry raw meal. The combustion is controlled so that the dry meal is heated to a temperature of between 100° and 600° C. and then fed to a cyclone separator which feeds a long dry process rotary kiln.

10 Claims, 2 Drawing Figures

METHOD AND APPARATUS FOR PROCESSING RAW MEAL HAVING A HIGH ALKALI CHLORIDE AND/OR SULFATE CONTENT

BACKGROUND OF THE INVENTION

1. Field of the Invention

The field of the invention is methods and apparatus for improving the production of cement from raw materials having high alkali chlorides and sulfates. More specifically, the method and apparatus of the present invention are directed to preheating of dry raw meal containing high alkali chloride and sulfate prior to introducing the meal into a long dry process rotary kiln.

2. Description of the Prior Art

Rotary kilns equipped with suspension cyclone preheater systems have gained substantial popularity in the manufacture of cement from raw meal since their introduction in the early 1950's. Many such systems utilize a standard four stage cyclone preheater kiln, which are noted for their high productivity and thermal efficiency. However, cement raw materials which are high in alkali chlorides and sulfates are not suitable for use in standard four stage cyclone preheater kilns. Volatilized alkali salts, particularly chlorides, carried by dust laden gases leaving the rotary kiln, condense in the lower temperature cyclone preheater system. This results in choking and jamming of the system due to a build-up of crust-forming deposits, particularly in the fourth stage cyclone preheater, where the temperature is approximately 820° C. The problem is aggravated by the inherent increase in alkali concentrations in the preheater system as a result of internal recycling. In addition, dust with high alkali content from dust collectors cannot be recycled and must be rejected.

The alkali chlorides volatilize before reaching sintering zone temperatures, and greatly enhance the possibility of forming crust deposits in the system. Permissible maximum chloride (Cl) content in raw meal is required to be as low as 0.05%. Typical maximum limits for total alkali (expressed as $Na_2O$) and of sulfate ($SO_3$) are 1.5% and 1% respectively. Where chloride contents are marginally higher, it is possible to reduce problems of choking by partially by passing kiln exit gasses. In addition, single or two-stage preheater systems with lower thermal efficiencies are less prone to choking and jamming problems.

Alkali encrustation has also been observed as a problem in other preheater cement production systems, such as those which utilize grate preheaters.

When cement is produced from raw meal having higher alkali chloride content, a long dry process kiln, with or without heat exchange chains, is commonly preferred, although this system is known to be less thermally efficient than four stage cyclone preheater kilns. Use of long dry process kilns substantially reduces problems resulting from alkali recycling and build up of encrustations in the kiln. However, to adapt present long dry process kiln systems to produce cement from high alkali and sulfate containing materials, modifications in operating practice are required.

These modifications include:

(a) maintaining a high exit gas temperature (over 500° C.) to prevent alkali chloride condensation and recycling in the kiln;

(b) avoidance of cyclone type dust collections with constricted sections that are susceptible to choking and jamming;

(c) use of cold air for cooling kiln exit gases to below approximately 400° C. to avoid damaging the waste gas fan; and (d) rejection of all or part of the collected alkali-rich dust to avoid build-up of chloride concentration in feed to the kiln.

In certain systems, where high alkali raw meal is processed, long dry process kilns can be operated on natural draft to avoid problems of cooling of high temperature exit gases. Otherwise cooling of exit gases is necessary to safe guard waste gas fans. The above pattern of operating precautions can be considerably relaxed for cement plants with relatively lower alkali chloride contents. Outputs of long dry process kilns are up to 2,000 tpd.

Heretofore several attempts have been made to increase the production of rotary cement kilns in terms of the tons of cement clinker produced, and to improve the thermal efficiency of the kiln. Examples of prior art methods and apparatus for making cement are disclosed in the following patents:

| U.S. Pat. No. | Patentee |
| --- | --- |
| 3,895,955 | Kondo, et al. |
| 3,986,886 | Sylvest |

The Kondo patent discloses the use of waste gases in stages of a cyclone preheater system for controlling the operating temperature in a rotary kiln, and utilizing a fluidized calcinator having a separate heat source to increase the capacity of the rotary kiln, whereby the kiln can be operated continuously and stably for long periods of time.

The Sylvest patent teaches drying of a raw meal slurry utilizing hot gases from a rotary kiln and a separate heater for providing supplementary hot gases to various stages of a multistage cyclone preheater system.

As will be described in greater detail hereinafter, the method and apparatus of the present invention differ from the teachings ofthese prior art patents by providing a separate combustion chamber for preheating dry raw meal containing high alkali chloride and sulfate quantities prior to feeding the meal to a single stage cyclone separator and a long dry process rotary kiln. Moreover, the method and apparatus of the present invention can be utilized with or without a vibratory deaerator after the cyclone separator to reduce entrainment of air in the raw meal feed.

SUMMARY OF THE INVENTION

According to the present invention there is provided a method for processing cement raw meal containing a relatively high amount of alkali chlorides and sulfates in the range of 2% Cl or 2.5% $SO_3$, wherein the method includes the steps of: metering the dry raw meal in the processing system to a separate combustion chamber, supplying fuel to the combustion chamber and igniting same therein, heating the raw material in the combustion chamber to a temperature between 100° and 600° C., pumping the heated dry raw material to a cyclone separator, processing the dry raw meal through the separator and supplying the preheated raw meal to a long dry process rotary kiln for producing cement clinker, where the temperature of the gas exiting from the kiln is increased to provide recoverable heat, and whereby the thermal efficiency and productive capacity of the kiln is increased.

Also, according to the invention there is provided an apparatus for processing cement raw meal having high alkali chloride and sulfate content including a hopper containing the raw meal, a continuous pneumatic pump, a device for metering the raw material to the pump from the hopper, a separate combustion chamber having an inlet coupled to the outlet of the pump, means for delivering fuel to the combustion chamber, means for igniting the fuel in the chamber, the combustion of the fuel being controlled so that the raw meal in the combustion chamber is heated to a temperature of between 100° and 600° C., a cyclone separator system, means for delivering the preheated dry raw meal to the separator system, and a long dry process rotary kiln connected to the output of the cyclone separator system.

DESCRIPTION OF THE PREFERRED EMBODIMENTS

Figure 1:
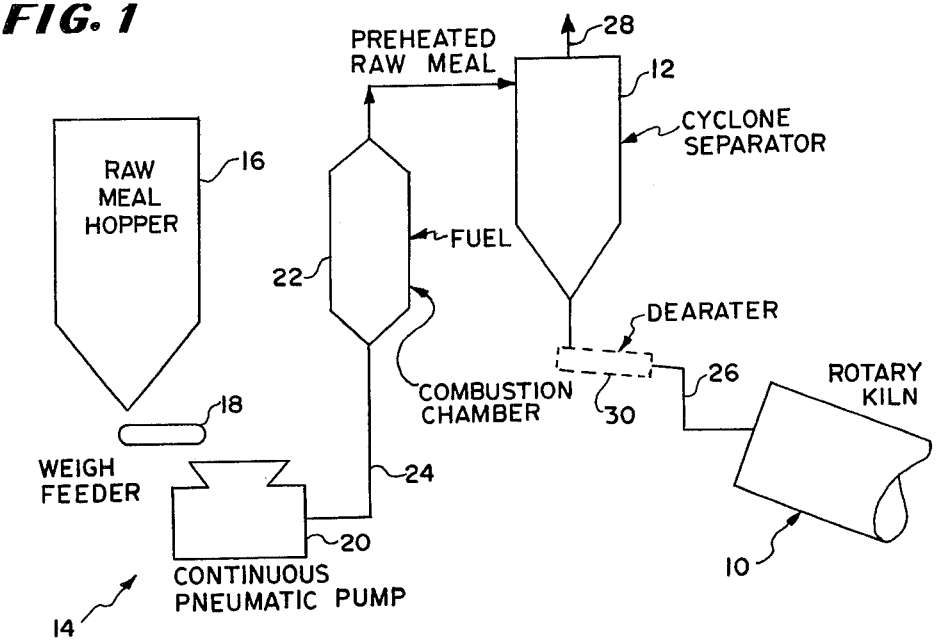
FIG. 1 is a block schematic diagram of one embodiment of the apparatus of the present invention showing a separate combustion chamber in the pneumatic transport line between a pump conveying raw meal from a hopper to the combustion chamber and a cyclone separator which separates preheated raw meal from the output of the combustion chamber just prior to supplying the heated meal to a long dry process rotary kiln.

Referring now to the drawings in greater detail there is illustrated schematically in FIG. 1 a long dry process rotary kiln 10 which is fed by a cyclone separator 12. This combination of rotary kiln 10 and cyclone separator is conventional.

According to the teachings of the present invention, there is provided a pumping and heating system 14 between a raw meal hopper 16 with a weigh feeder metering device 18 and the cyclone separator 12.

The pumping and preheating system 14 includes a continuous pneumatic pump 20 which receives metered dry raw meal, such as cement meal, powdered limestone, alumina hydrate, or the like. More specifically, the pumping and preheating system 14 is particularly adapted for receiving and heating raw meal having high alkali chloride and sulfate content, and then feeding the meal to cyclone separator 12 and rotary kiln 10 to produce cement clinker.

The dry raw meal received by continuous pneumatic pump 20 is pumped to a separate combustion chamber 22 where the raw meal is heated to a temperature of 100° to 600° C., typically up to a temperature of 400° C. Fuel such as oil, gas, or powdered coal is fed into combustion chamber 22 and ignited by an oil or gas pilot flame provided therein. Alternatively, powdered coal can be mixed with the dry raw meal either in hopper 16, at weigh feeder 18, or at the inlet to pump 20, and then pumped into chamber 22 with the dry raw meal where the powdered coal is ignited to heat the dry raw meal to a temperature between 100° and 600° C.

According to the teachings of the present invention and particularly the method of the present invention, dry raw meal for making cement clinker is dispensed from hopper 16 to weigh feeder 18 which meters dry raw meal into the continuous pneumatic pump 20. From there it is entrained in a pneumatic transport line 24 which feeds the separate combustion chamber 22 where the raw meal is preheated typically up to a temperature of 400° to 600° C. From there the preheated raw meal is fed to cyclone separator 12 and rotary kiln 10.

From numerical calculations it is estimated that the introduction of the extra heat input into cyclone separator 12 by preheating the raw meal in combustion chamber 22 permits an increase in the rotary kiln 10 output by up to 20% and an improved thermal efficiency. As compared to a typical fuel consumption of 1150 kcals/kg clinker (with raw meal feed having a high alkali content), when feeding preheated raw meal the overall fuel consumption (inclusive of combustion chamber 22 fuel requirements) will be reduced by about 100 kcals/kg clinker.

The table below indicates heat input into the rotary kiln 10 (net kcals/kg clinker) contributed by the preheated raw feed meal at different temperatures:

TABLE I

| Temp. of raw feed meal (°C.) | Additional heat input into kiln* (Kcals/kg clinker) |
| --- | --- |
| 50 (unpreheated) | — |
| 100 | 18 |
| 200 | 53 |
| 300 | 89 |
| 400 | 124 |

*Raw material/clinker ratio assumed to be 1.55

With increasing raw meal temperature there is a corresponding increase in exit gas temperature, which is estimated to be 150° to 200° C. above the temperature of the preheated feed. The gas exits cyclone separator 12 through pipe 28. However, in spite of the increased exit gas temperature, there is a reduction in exit gas volume ($Nm^3$/kg clinker). This is due to the reduced fuel quantity (net kcals/kg clinker) introduced into the kiln. The higher temperature waste gas heat can be utilized for example for raising steam for power generation or for desalination of sea/brackish water.

Preheating the raw meal will not have an adverse effect on meal with alkali chloride content of up to approximately 2.0% Cl, since the temperature of preheating is at a lower level. Another important advantage of the present invention is that in the indicated mole of preheating the raw meal in the combustion chamber, contact with alkali-rich dust-laden kiln exit gases is totally avoided.

The apparatus thus far described is the same, up to the stage of preheating the raw meal in combustion chamber 22, as the apparatus shown in my co-pending patent application Ser. No. 310,771, filed Oct. 13, 1981, entitled "Method and Apparatus for Preheating of Drug Raw Meal Prior to Introduction of the Meal into a Suspension Cyclone Preheater System Supplying a Rotary Kiln", now U.S. Pat. No. 4,366,000, the disclosure of which is incorporated herein by reference. It is to be noted however, that in the presently disclosed system, the primary function of the cyclone separator 12 is to separate raw meal (after it is preheated in the combustion chamber 22) from the carrier gas. The separated five raw meal is then introduced into the kiln 10 via a feed pipe 26. Such cyclone separator 12 functions differently than a cyclone preheater as described in the prior application Ser. No. 310,771 which is used in a two or four stage cyclone system for effecting heat transfer from hot kiln exit gases to raw meal that is fed to the preheater cyclone system.

The presently disclosed system is particularly designed to preheat and utilize raw meal with high alkali chloride and sulfate content, which is ultimately to be fed to a rotary kiln 10. When feeding directly to a rotary kiln, the raw meal and the gas stream associated therewith must first be passed through cyclone separator 12 for the separation of the raw meal, which is fed through feed pipe 26 to kiln 10. The separated conveying gas, which is a relatively small quantity, is discharged through pipe 28 into the main kiln dust collection system (not shown) that handles kiln exit gases. Alternately, a separate dust collector can be provided to recycle the small quantity of collected preheated dust.

Depending on raw material characteristics and the fineness of grinding, the separated raw meal exiting from the cyclone separator would be associated with varying amounts of entrained air. With higher entrained air content, raw meal would tend to have a higher fluidised flow characteristic. This could result in higher dust loss when such feed is introduced into kiln 10. To minimize undesired kiln dust losses, raw meal discharged from cyclone separator 12 can be passed through a deaerator 30 prior to introduction to the kiln. Deaerator 30 would reduce kiln dust losses by removing or reducing the entrainment of air in the raw meal feed.

Figure 2:
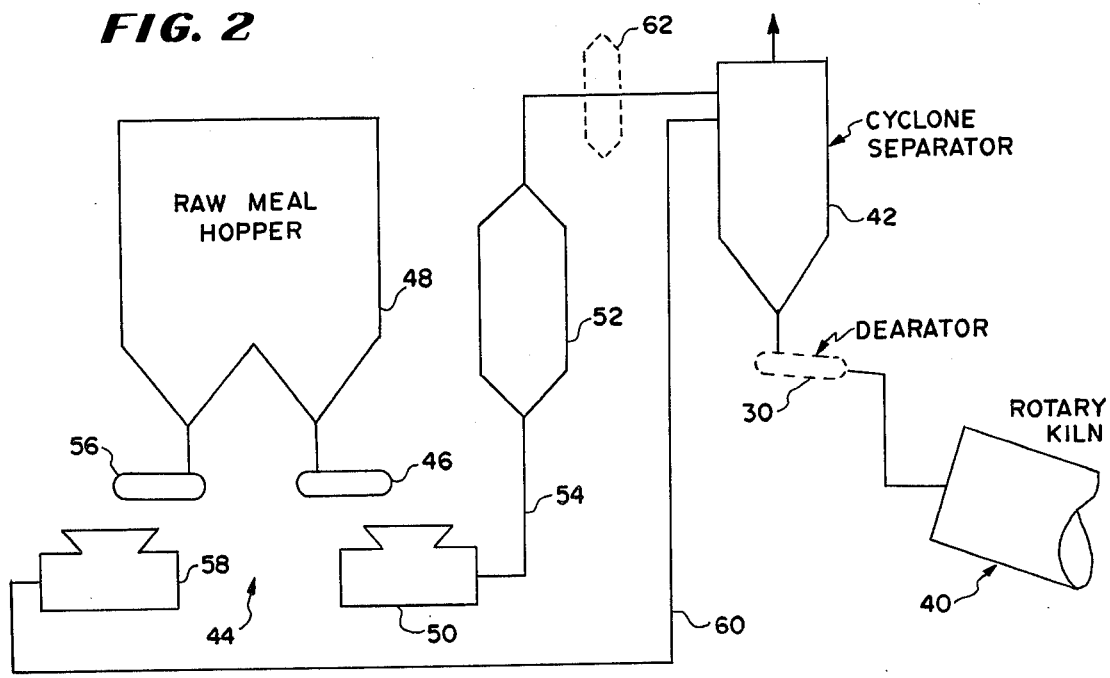
FIG. 2 is a block schematic diagram of another embodiment of the apparatus of the present invention showing a pneumatic transport line for transmitting unpreheated dry raw meal directly to the cyclone separator, which also is supplied with a separate preheated raw meal stream from the combustion chamber, and means for delivering the separated raw meal from the cyclone separator to the long dry process rotary kiln.

Referring now to FIG. 2, there is illustrated therein a block schematic diagram of another embodiment of the present invention where a long dry process rotary kiln 40 is supplied with preheated raw meal from a cyclone separator 42. The cyclone separator 42 is fed by a pneumatic pumping and preheating system 44, including a weigh feeder 46 which receives raw meal from a hopper 48 and meters or dispenses the dry raw meal into a continuous pneumatic pump 50 which delivers the dry raw meal to a separate combustion chamber 52 which is serially connected in a pneumatic transport line 54 leading to cyclone separator 42.

Additionally, hopper 48 dispenses dry raw meal to a second weigh feeder 56 which meters or dispenses dry raw meal to a continuous pneumatic pump 58 which feeds the dry raw meal via a pneumatic transport line 60 to cyclone separator 42.

In this embodiment, raw meal is heated in the separate combustion chamber 52 by fuel that is fed into the chamber and ignited by a pilot flame located therein and fed by gas or oil. However, in this embodiment, unheated dry raw meal is fed directly via the continuous pneumatic pump 58 and transport line 60 to cyclone separator 42 where it is mixed with the preheated dry raw meal.

Typically, the two streams of dry raw meal, one preheated and one unpreheated, are mixed in a ratio of 1:1 in the cyclone separator 42. Typically, the temperature of the unpreheated stream of dry raw meal is approximately 50° C., and the preheated dry raw meal stream is fed at a temperature of 600° C. When these two streams are mixed, the average raw meal preheat temperature will be approximately 375° C.

A modification of the method and apparatus illustrated by the block schematic diagram in FIG. 2 is to include an auxiliary burner-combustion furnace 62 between chamber 52 and cyclone separator 42 so that better control of the temperature of the preheated dry raw meal can be achieved. Such an additional burner-combustion furnace will facilitate the maintenance of a steady desired preheated raw meal temperature. The additional heat introduced into the cyclone separator permits an increase in the system's thermal load handling. In this way, it is possible to obtain an increase in the kiln output and a reduction in fuel input (net kcals/kg clinker) for the long dry process rotary kiln.

Also, since the separate combustion chamber 52 can be added to a system having a transport line 60 which is previously feeding unpreheated raw meal to cyclone separator 42, there will be no operational problems in reverting to a direct feed of strictly unpreheated raw meal if and when desired.

From the foregoing description it will be apparent that the method and apparatus of the present invention have a number of advantages some of which are described above and others of which are inherent in the invention. Also, as described above, many modifications can be made to the method and apparatus of the present invention without departing from the teachings of the present invention. Accordingly, the scope of the present invention is only to be limited as necessitated by the accompanying claims.

I claim:

1. A method for processing raw meal in an installation for calcination of granular, powdered limestone, aluminum hydrate, or the like including those having relatively high alkali chloride and/or sulfate content of up to 2% Cl and/or 2.5% $SO_3$, said method including the steps of metering dry raw meal into a processing apparatus, pumping said raw meal from said processing apparatus to a separate combustion chamber, supplying fuel to said combustion chamber and igniting same whereby said dry raw meal in said combustion chamber is heated to a temperature in the range between 100° C. and 600° C., pumping said heated dry raw meal to a cyclone separator, processing said dry raw meal through said cyclone separator to a long dry process rotary kiln, whereby the temperature of the gas exiting the cyclone separator is typically in the range of 150° C. to 200° C. above the temperature of said raw meal as it exits said combustion chamber (above 450° C.) and the thermal efficiency of said processing apparatus is improved.

2. A method for producing cement clinker including the steps of metering dry raw meal having a relatively high alkali chloride and/or sulfate content of up to 2% Cl and/or 2.5% $SO_3$ into a processing apparatus, pumping said dry raw meal from said processing apparatus to a separate combustion chamber, supplying fuel to said combustion chamber and igniting same, heating said dry raw meal in said combustion chamber to a temperature between 100° C. and 600° C., pumping said heated dry raw meal to a cyclone separator and processing said dry raw meal through said cyclone separator to a long dry process rotary kiln whereby the temperature of the gas exiting said cyclone separator is in a range of 150° to 200° C. above the temperature of said raw meal as it exits said combustion chamber (above 450° C.) and the thermal efficiency of said processing apparatus is improved.

3. The method according to claim 2 wherein a stream of unpreheated dry raw meal is pumped to said cyclone separator and mixed with the preheated dry raw meal in said cyclone separator.

4. The method according to claim 3 wherein the proportion of said preheated dry raw meal mixed with said unpreheated dry raw meal is in the range of 20 to 70% as required.

5. The method according to claim 4 wherein said unpreheated dry raw meal is at a temperature of 50° C. upon entering said cyclone separator, said preheated raw meal is at a temperature of 600° C. as it enters said cyclone separator, and the resulting temperature of the combined streams of preheated dry raw meal and unpreheated dry raw meal is approximately 325° C.

6. The method according to claim 2 wherein the fuel supplied to the separate combustion chamber is selected from the class consisting of oil, gas and powdered coal.

7. The method according to claim 2 wherein the fuel is powdered coal and is supplied to the separate combustion chamber by mixing the powdered coal with the unpreheated dry raw meal that is fed into the separate combustion chamber such that the fuel and dry raw meal are fed simultaneously into the separate combustion chamber.

8. A method of processing raw meal such as cement raw meal, powdered limestone, aluminum hydrate or the like having a high alkali chloride and/or sulfate content of up to 2% Cl and/or 2.5% SO$_3$, said method including the steps of metering a quantity of dry raw meal into a first input stream in a processing system comprising a cyclone separator, said first stream leading directly to said cyclone separator, metering another quantity of dry raw meal and supplying it to a second input stream in said processing system, said second stream including a separate combustion chamber, supplying fuel to said combustion chamber and igniting same therein, heating said dry raw meal in said combustion chamber to a temperature between 100° and 600° C., pumping said heated dry raw meal from said combustion chamber to said cyclone separator, processing said dry raw meal into said cyclone separator in two streams and through said cyclone separator, whereby the exit gases from said separator are above 450° C., to a long dry process rotary kiln whereby the thermal efficiency of said processing system is enhanced.

9. The method according to claim 1 including the step of utilizing the higher temperature exit gas for the production of steam.

10. The method according to claim 2 including the step of deaerating the preheated dry raw meal prior to the delivery of the preheated dry raw meal to the kiln.

* * * * *